(12) United States Patent
Weinblatt

(10) Patent No.: US 10,015,534 B1
(45) Date of Patent: Jul. 3, 2018

(54) PROVIDING HIDDEN CODES WITHIN ALREADY ENCODED SOUND TRACKS OF MEDIA AND CONTENT

(71) Applicant: Lee S. Weinblatt, Teaneck, NJ (US)

(72) Inventor: Lee S. Weinblatt, Teaneck, NJ (US)

( * ) Notice: Subject to any disclaimer, the term of this patent is extended or adjusted under 35 U.S.C. 154(b) by 0 days.

(21) Appl. No.: 15/413,186

(22) Filed: Jan. 23, 2017

Related U.S. Application Data

(60) Provisional application No. 62/281,881, filed on Jan. 22, 2016.

(51) Int. Cl.
*H04H 60/32* (2008.01)
*H04N 21/25* (2011.01)
*H04N 21/466* (2011.01)
*H04N 21/258* (2011.01)

(52) U.S. Cl.
CPC ..... *H04N 21/251* (2013.01); *H04N 21/25883* (2013.01); *H04N 21/4667* (2013.01)

(58) Field of Classification Search
CPC combination set(s) only.
See application file for complete search history.

(56) References Cited

U.S. PATENT DOCUMENTS

2016/0012807 A1 * 1/2016 Neuhauser ............ G06F 17/28 704/203
2016/0294484 A1 * 10/2016 Hiscock ................ G10L 19/018

* cited by examiner

Primary Examiner — Mulugeta Mengesha
(74) Attorney, Agent, or Firm — Goldberg Cohen LLP

(57) ABSTRACT

A system to facilitate measuring consumer use by using codes embedded in any raw audio or video content. The original code is then layered with additional codes either by modifying the original code or by adding additional codes in between the original code. The system recognizes a code embedded into an audio and/or video signal. This can help track consumer use and viewing.

4 Claims, 3 Drawing Sheets

PROVIDING HIDDEN CODES WITHIN ALREADY ENCODED SOUND TRACKS OF MEDIA AND CONTENT

RELATED APPLICATIONS

This application claims the priority of U.S. Provisional Application Ser. No. 62/281,881 filed Jan. 22, 2016, which is hereby fully incorporated herein by reference.

BACKGROUND OF THE INVENTION

It is a pervasive and common problem that there is no way to efficiently and accurately measure media audience demographics. Companies currently use paper diaries to collect demographic data in mid-size United States television markets. Some companies are now starting to replace this method with a new "Viewer Assignment" method. This method uses a probability-of-viewing model based on look-alike homes within the area.

The problem with the viewer assignment method is that there is no accuracy in measuring the specifics of which viewers are in front of the television or radio at any given time. Companies, such as Nielsen, for example, have been losing their MRC (Media Rating Council) accreditation for this part of the data.

Other companies that continued to use the diary-only method also lost their accreditation for local TV ratings after the MRC found the company had not mailed enough of the diaries to households to generate what it considers a sufficient sample size.

Likewise it is problematic to measure such viewing if the content is being delivered by traditional antenna, cable, satellite, streaming, Roku etc. Even more, each content provider, broadcaster, and re-transmitter needs their own individual audience ratings to properly invoice clients.

The present invention solves these disadvantages as it has a code for each program, each delivery media and each content. These codes are all received by a personal smartphone or tablet and, therefore, can be continuously monitored and recorded.

SUMMARY OF THE INVENTION

The present invention provides a solution for the problems and shortcomings of the currently existing technology.

The present invention uses a method of layering codes in order to track the consumers' viewing.

In accordance with the present invention, a code is embedded into the content of interest. The microphone on a user's device picks up the content, an application on the user's device monitors for the code in that content, and then the application captures that code. One or more further codes may be layered on top of the original code.

DETAILED DESCRIPTION OF THE INVENTION AND THE PREFERRED EMBODIMENTS

Figure 1:
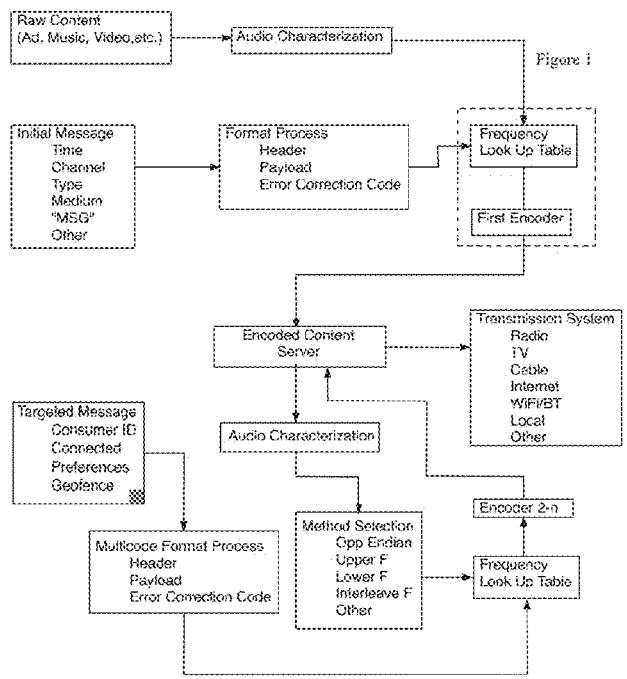
FIG. 1 is a schematic of a method in accordance with the present invention.

The invention relates to the field of facilitating tracking of audiences. It can be utilized by any type of user (also referred to herein as the consumer). It is particularly useful for providing information as to who is viewing various types of content and media at any given moment.

The consumer tracking is accomplished by embedding one or more codes layered on top of an original code in the content.

In its various forms, the present invention can be used with any type of audio and/or video content. For example, it can be used with commercials, television programs, radio broadcasts, internet, videos, songs, in-store displays, loudspeaker announcements, or any other type of audio and/video content ("content").

In accordance with the present invention, a code is inserted into the content at issue. Preferably, the code is inserted at regular intervals, and preferably at least once every second.

Preferably, the code is a further audio signal inserted into the content's audio portion. Further preferably, the code is within the 50 Hz-10 kHz range so that it can work with communication through internet videos. In alternative embodiments, however, the code can be below 50 Hz and/or above 10 kHz (e.g. up up 40 kHz).

Yet further preferably, the code is an audio signal which is inaudible to the user. Incorporation of the audio signal and its inaudibility are provided via any of the methods known in the art. Preferably, inaudibility is provided by scattering the audio code among the frequencies of the raw content, and/or by broadcasting the audio code at a frequency which the user cannot hear, but which can be picked up by the application in a user's device (such as a phone, a table, a laptop computer, or any computing other device with a microphone).

Further layers of codes are embedded on top of the original code. There are two ways to provide these codes. The encoder of the present invention can detect original code and make further modifications to this code, or it can provide one or more codes beyond the original code, to provide two (or more) codes in the signal.

Currently, basic notching is used for encoding and decoding data in a signal. However, the net result of this encoding scheme is an audio stream for which, when integrated over time, yields generally low energy at specific frequencies that correspond to the symbols in the coded message. A simple way to visualize this encoding technique is as the output of an energy graph of the spectrum, one would see dips below the ambient energy at the points where the filter was applied.

In a perfect transmission, decoding is the simple application of determining the frequencies of the low energy troughs and reverse mapping those frequencies to symbol values. This operation yields the symbol values, which can then be decoded to recover the original message.

In practice, an application accumulates an audio buffer of a given length, which is then processed via FFT to yield an array of values representing energy in a given frequency. This array is then summed with the energy array from previous audio buffers in order to provide a history/accumulation.

The accumulated array is then searched to find the lowest frequency points for each possible notch location. The collection of lowest frequency locations is used to generate the symbol list used in message decoding. The error correction inherent in the coding scheme serves to correct for any small number of frequencies which happen to have lower energy than the notched frequency during a given decode iteration. A failed decode attempt either indicates that there is no message present or too many errors in the detected lowest energy frequencies.

In the typical instantiations the mapping of code symbol values into frequencies is accomplished through a linear map of spaces (it can be described as an affine transform of the symbol values bitwise into frequency space). This results in a few limitations of interest:

1. Any standard code can be detected by any standard decoder—while software may sort out what codes to respond to or not, the software can be (will be) aware that it 'heard' encoded audio.
2. There is no mechanism to 'expire' old code values—as the code space is used, it cannot be replenished, although very old codes are less and less likely to be recorded and/or heard by a listener.
3. A sufficiently skilled engineer (likely with some inside information) can detect coded audio, even if they do not have enough information to actually recover the data value.
4. Any audio segment can only transmit a single code.
5. Any given code can be recorded and received at any time (ie. allows for timeshifting and multiple playbacks).

The following techniques provide limited to extensive solutions to the above limitations. Provided that each code block compared for lowest energy level is closely associated in frequency (so as to avoid increasing the risks of false values), these larger symbol blocks and even the value ordering within those blocks, may be rearranged (including position, offset, and frequency spacing as well). This is, in essence, akin to big-endian vs. little-endian in binary representation. During decode, this alternative mapping is used in order to reconstruct the symbol values. The message can only be properly decoded if the decoder is in possession of the correct symbol to frequency mapping. In this way, the coded messages differs from endian-ness or other pure binary mapping: where a binary mapping would not be able to tell that the message value recovered was incorrect, because this system uses forward error correction, any decode attempted with the wrong mapping will result in too many errors to successfully decode rather than an incorrect value (note that due to information density limits, if the symbol ordering is the only change from one mapping to another, there can exist codes which result in false positives or otherwise overlap if enough multiplexed orderings are used).

In the most direct usage, varying the code block and locations removes the limitation described in (1). This method also provides a mechanism for (2) by having decoders occasionally update their mapping information so as to not detect older coded audio.

Limitation (3) may be addressed by utilizing a tightly coupled clock between decoder and audio transmission (such as GPS or start/timing code) and rather than accumulating energy purely by frequency into the power bins, accumulating power based on a varying set of frequencies: e.g. symbol A has frequency F0 from time 0 to time 1, but frequency F1 from time 1 to time 2. The comparison bin used for accumulation can contain the energy value of (F0(time 0 to time 1)+F1(time 1 to time 2)) when evaluated for time 0 to 2. Since all potential symbol value locations can be varied in this fashion and is not known to the outsider provide that they do not know the frequency key, it becomes significantly more difficult to distinguish the coding from background noise.

Using the 'frequency hopping' technique listed above and strictly tying the decode value to time, this technique can supply a code which is only valid at a precise instant in time, addressing limitation (5).

Finally, limitation (4) can be addressed by sacrificing enough spectrum space such that two coding schemes can be described without overlapping symbol space. While this is not an ideal solution, it does suggest that if multiplexing capability is desired, one can define more limited code mappings to allow the selection of non-overlapping frequencies.

The watermarking technique currently in use consists of a frequency domain filter applied to any human audible audio stream. Its basic method of application is as a narrow band notch filter applied to the audio stream in multiple frequencies selected to correspond from a mapping of the symbol set from a Reed-Solomon coded message into frequencies. In principle any other error-correcting scheme would work (Hamming, LDPC, etc) in a similar fashion, so this document will refer to simply the coded message from hereon.

There is another technique to extend the range and performance of the watermarking detection algorithm.

The net result of this encoding scheme is an audio stream for which, when integrated over time yields generally low energy at specific frequencies that correspond to the symbols in the coded message. A simple way to visualize this encoding technique is as the output of an energy graph of the spectrum, one would see dips below the ambient energy at the points where the filter was applied.

In a perfect transmission, decoding is the simple application of determining the frequencies of the low energy troughs and reverse mapping those frequencies to symbol values. This operation yields the symbol values, which can then be decoded to recover the original message.

In practice, an application accumulates an audio buffer of a given length, which is then processed via FFT to yield an array of values representing energy in a given frequency. This array is then summed with the energy array from previous audio buffers in order to provide a history/accumulation.

The accumulated array is then searched to find the lowest frequency points for each possible notch location. The collection of lowest frequency locations is used to generate the symbol list used in message decoding. The error correction inherent in the coding scheme serves to correct for any small number of frequencies which happen to have lower energy than the notched frequency during a given decode iteration. A failed decode attempt either indications no message present or too many errors in the detected lowest energy frequencies.

Furthermore, extensions to this method of decode have been developed in order to extend effective range and interference tolerance by modifying the accumulation buffer function and the search algorithm. Specifically, in a preferred embodiment the decoder uses multiple power history accumulation buffers that follow different decay factors. Each of these power accumulation buffers is evaluated separately for the lowest energy frequencies. By doing this, performance is extended in marginal detection environments (by allowing for a longer accumulation of energy), but rapid response to a new coding is still supported (by maintaining an accumulation buffer that only utilizes the most recent audio buffer). The decoder is then capable of reporting a valid message if any of the accumulation buffers successfully decode the message.

This technique only marginally impacts CPU utilization because the only duplicated processing is the row-wise summation and decay of the accumulation buffer, the search for lowest energy frequencies, and the attempted decode of the coded message.

Many coding techniques also support correcting "erasures" as well as errors, where an erasure is defined as a symbol that has too little information to be given a defined value prior to a decoding attempt. For example, Reed-Solomon coding supports correcting twice as many erasures as it does errors for any given decode attempt. While this has not been implemented yet, utilizing erasure detection and using that to inform the decoder should also improve performance significantly.

Additionally, techniques are preferably used to account for frequency drift on playback devices—a particular weakness of tape based media, but present in many other formats as well. In this case, in addition to attempting to decode on the lowest energy frequencies, the present invention applies multiple linear shifts to the detected frequencies and attempts additional decodes at these adjusted frequencies/symbol values in order to identify the frequency shift. Since the domain of valid symbol sets is very small, the likelihood of accidentally running into a different code is very small as well.

There are various uses for this:

One use is that any net radio or net video client knows what it was tuned to and when (properly configured). This can be communicated back to the advert server to provide targeted or non-targeted advertisements based on or filtered by:
  a. user provided preferences and demographics
  b. user allowed Geographic or IP based geographic
  c. the content on the net radio or video stream
  d. feedback on previous offers A second use is within an application or server side offers can be generated based on these targeted or non-targeted advertisements with the following unique characteristics:
  a. They can be tracked to the user and maintained in a separate or integrated 'wallet' for later use just as watermarked media.
  b. 'wallet' can track expiration or accumulation in value
  c. Filter and offer usage preferences can be tracked from the utilization or feedback on these offers for better:
    i. Targeting of other advertisements
    ii. Targeting of other offers
    iii. Filtering of offers
    iv. Analytics on effectiveness of offers
    v. Analytics on demographic response to product Preferences and behaviors for these offers can be tracked across different media.
  a. E.g. Net-radio to net-video to watermarked video/audio content on traditional broadcast media.
  b. Offers can present a consistent campaign across varied media
    i. Maintain data about redemption from each distinct media source
    ii. Maintain data about reception from each distinct media source
  c. Generate different offers based on 'heard' placements regardless of media.

A fourth use is a wallet (potentially shared with watermarked wallet) which can:
  a. Serve as general repository of offers
  b. Be filtered based on user preferences and demographic
  c. Include additional incentives for use
    i. Value accumulation/reduction based on additional advertisement reception or survey response
    ii. Value accumulation/reduction based on usage during specific time span
    iii. Value accumulation/reduction based on related offer usage
    iv. Status responses (e.g. user account levels; non-product offerings)
  d. Track utilization
  e. Encode membership information into displayed offer:
    i. Frequent flier/hotel program tie ins
    ii. Grocery buyers club number One or more of these further layers of codes can be provided initially with the original encoding. Alternatively, one or more of these further layers of codes can be provided well after the original encoding is completed.

The code embedded into the raw content can be of any length desired. However, in a preferred embodiment, the code is sufficiently long to include information that identifies the content that it is inserted into (e.g., the particular television program, video, commercial, or so forth), and to identify the particular time stamp in that content where the code is broadcast (e.g. 2 minutes 4.3 seconds after the start of the video). In a further preferred embodiment, each code is preferably at least 26 digits in length.

FIG. 1 is a flowchart of a preferred method in accordance with the present invention, and FIGS. 2 through 6 provide several schematics of the preferred method.

Figure 2:
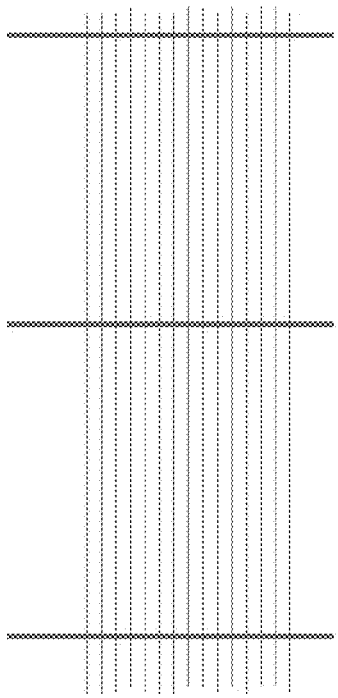
FIG. 2 is a schematic of audio frequencies before provision of codes thereto.

As illustrated in FIG. 2, several lines of audible sound frequency during a two second interval, wherein the sound frequency is in its original form, before the provision of codes thereto.

Figure 3:
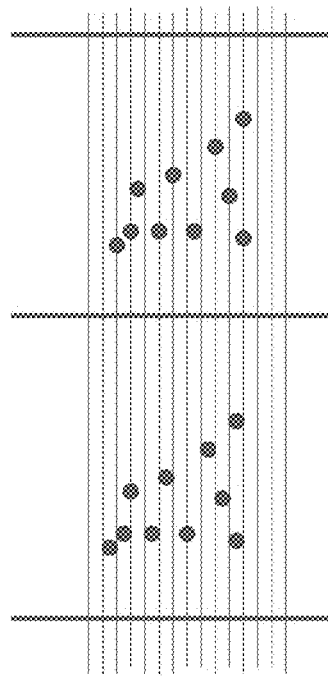
FIG. 3 is a schematic of the provision of codes (by subtraction) in accordance with the present invention.

FIG. 3 illustrates digits of code "notched" out of the audio and placed among different frequencies during each second. Importantly, in accordance with the preferred embodiment of the invention, by the term "notched," the present inventor refers to the removal of audio rather than addition. Previously, methods of audio encoding have consisted of the addition of codes, sounds, digits or frequencies to the audio track. In accordance with the present invention, the "notching" of the code consists of the removal of codes, sounds, digits or frequencies from the audio. The present invention makes small audio "notches" in the playing audio in different frequencies.

Figure 4:
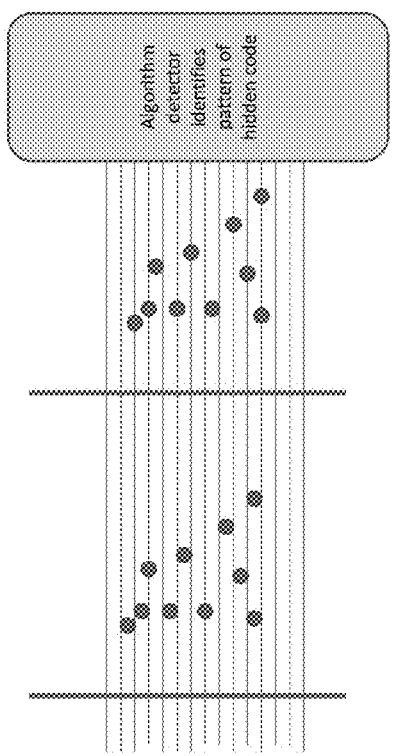
FIG. 4 is a schematic of the detection of code in accordance with the present invention.

As shown in FIG. 4, an algorithm analyzes the sound, and detects the pattern of notches (audio subtractions), thereby identifying the hidden code. The sound can be captured by a microphone (e.g. sound in the background) or by any other means (e.g. sound that has been streamed over the internet), after which it is recognized by a software program containing an algorithm programmed to detect the subtractions.

Figure 5:
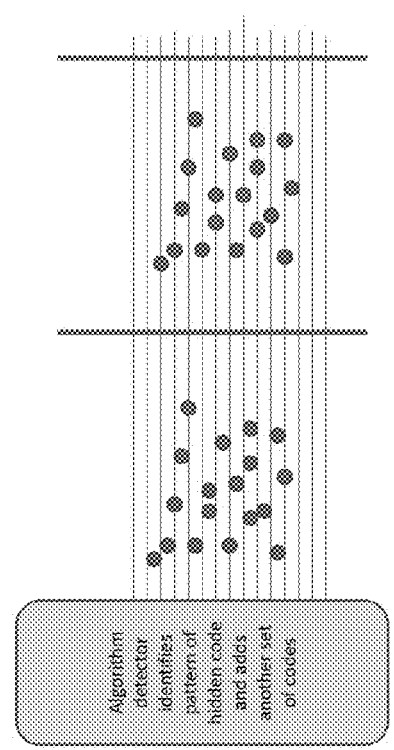
FIG. 5 is a schematic of the provision of a further layer of code in accordance with the present invention.

In a further embodiment, as shown in FIG. 5, an algorithm detector-encoder can provide another set of hidden codes to the captured audio (whether audio that has passed through a microphone or been captured by another method (such as streaming). Any method of provision of codes can be used, although further notches (subtractions) are utilized.

Figure 6:
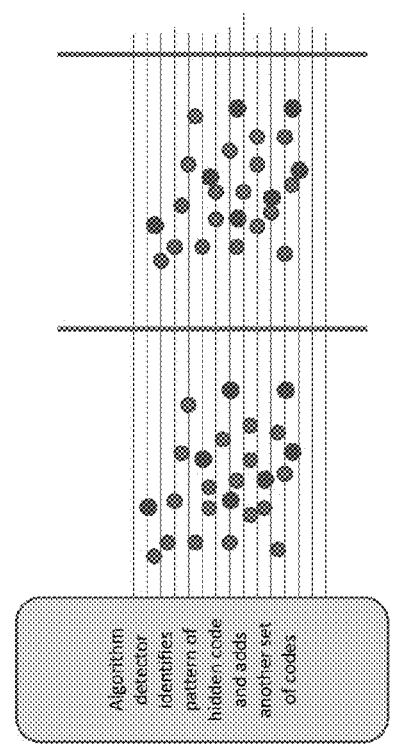
FIG. 6 is a schematic of the provision of a third layer of code in accordance with the present invention.

As shown in FIG. 6, if desired a third layer of codes can be provided. Likewise, any desired number of layers of code can be included, with each layer preferably being provided by notching.

Each code pattern, when received by our computers, can be used to send a customized audio or video to a consumer's receiver (e.g. smartphone, PC, tablet, or so forth), not burdening the device's memory, nor requiring heavy encoding.

Accordingly, the present invention presents numerous advantages over the art. For example, by subtracting instead of adding data when encoding, the present invention does not make the audio files any larger. Likewise, the codes are not perceptible by technology looking for a code, the codes are not removable, and they fit within the standard audio range.

In addition, the invention solves many of the shortcomings of the current existing techniques of measuring and tracking customer viewing.

Other patents relating to the present invention include U.S. Pat. Nos. 6,993,284; 8,464,310; 7,155,159; 8,250,596; 7,950,031; 8,631,427; and, 8,555,305, all of which are fully incorporated herein by reference. Any of the methods and systems disclosed in those patents can be used in conjunction with the inventions described herein.

The above description is considered that of certain embodiments of the present invention only. Modifications of the invention will occur to those skilled in the art and to those who make or use the invention. Therefore it is understood that the embodiments described herein are merely for illustrative purposes only and are not intended to limit the scope of the invention.

What is claimed is:

1. A method of embedding a layer of code in audio content, the method comprising the steps:
   receiving audio content comprising a plurality of audio frequencies;
   routing the audio content through an encoding apparatus;
   selecting a predetermined time interval of the audio content;
   removing segments of the plurality of the audio frequencies of the audio content within the predetermined time interval, the pattern of the removals within the predetermined time interval corresponding to a layer of designated readable code comprising a plurality of digits;
   broadcasting the audio signal for reception by a receiving device;
   wherein the layer of code is readable by the receiving device having a microphone to sense the audio content, and further wherein the device senses the pattern of audio removals and translates the pattern to the plurality of digits comprising the code.

2. A method as claimed in claim 1, further comprising the step of embedding a further layer of code into the audio content by removing additional audio segments from the audio frequencies of the audio content.

3. A method as claimed in claim 1 wherein the selected predetermined time interval is two seconds.

4. A method as claimed in claim 1 wherein the designated readable code comprises at least 26 digits.

* * * * *